(12) United States Patent
Van Gestel (10) Patent No.: US 6,289,171 B1
(45) Date of Patent: Sep. 11, 2001

(54) ARRANGEMENT FOR RECORDING OR REPRODUCING A DIGITAL VIDEO SIGNAL AND A CORRESPONDING DIGITAL AUDIO SIGNAL

(75) Inventor: Wilhelmus J. Van Gestel, Eindhoven (NL)

(73) Assignee: U. S. Philips Corporation, New York, NY (US)

( * ) Notice: Subject to any disclaimer, the term of this patent is extended or adjusted under 35 U.S.C. 154(b) by 0 days.

(21) Appl. No.: 08/385,511

(22) Filed: Feb. 8, 1995

(30) Foreign Application Priority Data

Feb. 10, 1994 (EP) .................................................. 94200326

(51) Int. Cl.⁷ ........................................................ H04N 5/78
(52) U.S. Cl. .............................. 386/96; 386/104; 360/18; 360/134
(58) Field of Search ................................... 360/19, 1, 18, 360/27, 32, 33.1, 134, 13; 358/335, 343; 386/46, 96, 98, 99, 104, 52, 54; 369/83

(56) References Cited

U.S. PATENT DOCUMENTS

| | | | |
|---|---|---|---|
| 4,353,098 | * 10/1982 | Heinz ................... | 360/19.1 |
| 4,530,015 | * 7/1985 | Yanagida ............. | 360/33.1 |
| 5,012,352 | * 4/1991 | Yoshimura .......... | 360/19.1 |
| 5,121,259 | 6/1992 | Yamashita ........... | 360/19.1 |
| 5,245,483 | 9/1993 | Van Gestel ............. | 360/40 |
| 5,323,396 | 6/1994 | Lokhoff ................. | 370/94.1 |
| 5,359,464 | * 10/1994 | Wilkinson ............ | 360/19.1 |
| 5,365,553 | 11/1994 | Veldhuis et al. ...... | 375/122 |
| 5,367,608 | 11/1994 | Veldhuis et al. ..... | 395/2.38 |
| 5,400,187 | * 3/1995 | Van Gestel ............. | 360/48 |
| 5,424,878 | * 6/1995 | Rijckaert ............. | 360/19.1 |

FOREIGN PATENT DOCUMENTS

| | | |
|---|---|---|
| 0470472 | 2/1992 | (EP) . |
| 0574889 | 12/1993 | (EP) . |
| 16077 | * 1/1991 | (JP) ................... 360/19.1 |
| 36452 | * 2/1994 | (JP) ................... 360/19.1 |

* cited by examiner

Primary Examiner—Alan T. Faber
(74) Attorney, Agent, or Firm—Edward W. Goodman (57) ABSTRACT

An arrangement for recording a digital video signal and a corresponding digital audio signal in slant tracks on a longitudinal magnetic record carrier, tracks having an audio signal recording sector and a video signal recording sector, for storing the digital audio signal and the digital video signal respectively, includes first and second input terminals (10,11) for receiving the digital audio signal and the digital video signal respectively, a conversion circuit (14,16,26) for converting the digital audio- and video signals so as to obtain a composite signal which can be recorded on the record carrier, a recording device (28,30) for the recording of the converted audio- and video signals in said composite signal in the audio signal recording sector and the video signal recording sector respectively of a track, the video signal recording sector in a track further comprising an auxiliary signal recording part for storing the digital audio signal as well.

11 Claims, 5 Drawing Sheets

ARRANGEMENT FOR RECORDING OR REPRODUCING A DIGITAL VIDEO SIGNAL AND A CORRESPONDING DIGITAL AUDIO SIGNAL

BACKGROUND OF THE INVENTION

1. Field Of The Invention

The invention relates to an arrangement for recording a digital video signal and a corresponding digital audio signal in slant tracks on a longitudinal magnetic record carrier, tracks comprising an audio signal recording sector and a video signal recording sector, for storing the digital audio signal and the digital video signal respectively, the arrangement comprising first and second input terminals for receiving the digital audio signal and the digital video signal respectively, conversion means for converting the digital audio- and video signals so as to obtain a composite signal which can be recorded on the record carrier, recording means for the recording of the converted audio- and video signals in said composite signal in the audio signal recording sector and the video signal recording sector respectively of a track, the video signal recording sector in a track further comprising an auxiliary signal recording part for storing an auxiliary signal. The invention also relates to an arrangement for reproducing a digital video signal and a corresponding digital audio signal from a longitudinal magnetic record carrier, signals being recorded in slant tracks on a longitudinal magnetic record carrier, tracks comprising an audio signal recording sector and a video signal recording sector, in which a first information signal relating to the digital audio signal and a second information signal relating to the digital video signal respectively are stored, the video signal recording sector in a track further comprising an auxiliary signal recording part in which a third information signal representing an auxiliary signal can be stored, the arrangement comprising, reading means for reading the signals recorded in the tracks, and for retrieving the first and second information signal originally stored in the audio signal recording sector and the video signal recording sector respectively in a track, reconversion means for reconverting the first information signal and the second information signal into a reproduced digital audio- and video signal respectively, first and second output terminals for supplying the reproduced digital audio signal and

2. Description Of The Related Art

A recording arrangement as described in the opening paragraph is known from European Patent Application EP-A 492,704, corresponding to U.S. Pat. No. 5,245,483, document (1) in the list of references.

The known arrangement records a digital audio signal and a digital video signal in audio signal recording sectors and video signal recording sectors, respectively, where, when recording a track, the video signal recording sector in a track comes first and is followed by the audio signal recording sector. The order in which the sectors occur in a track can, however, also be in the reverse order. Further, other sectors may be included in a track, such as a clock run-in area located at the beginning of a track, so as to enable a locking-in of the internal system clock on the signals read from the track, and preamble and postamble areas that are located between the various sectors and function as an edit gap. Reference is made in this respect to the earlier filed European patent applications no. 93,202,950, corresponding to U.S. patent application Ser. No. 08/127,233, filed Sep. 27, 1993, now U.S. Pat. No. 5,424,878, reference (2) in the list of references and no. 93,201,263, corresponding to U.S. patent application Ser. No. 08/185,638, filed Jan. 24, 1994, and now U.S. Pat. No. 5,400,187 reference (3) in the list of documents.

The video signal recording sector includes an auxiliary signal recording part for storing an auxiliary signal. This auxiliary signal can be teletext data or control data.

Both references (2) and (3) mentioned above mention the possibility of carrying out an editing function on the signals stored in the audio signal recording sector and/or the video signal recording sector.

SUMMARY OF THE INVENTION

The invention aims at improving the editing possibilities. To that purpose, the arrangement given in the opening paragraph is characterized in that the arrangement is further adapted to store the digital audio signal in the auxiliary signal recording parts of the video signal recording sectors in the tracks.

The invention is based on the recognition that editing of the audio signal recording sector means that the signals stored in the audio signal recording sector are overwritten by another audio signal. As a consequence, the original audio signal that corresponds to the video signal recorded in the video signal recording sector is lost. In accordance with the invention, the original audio signal is also recorded in the auxiliary signal recording part of the video signal recording sector. A subsequent editing of the audio signal, means that only the contents of the audio signal recording sector is affected, the contents of the video signal recording sector however remains unaffected. As a result, an edited version of the original recording has been obtained, while the original audio signal is still available for further editing or reviewing functions.

The recording arrangement may be further characterized in that the conversion means are further adapted to convert the digital audio signal into a second converted digital audio signal so as to obtain the composite signal and the recording means further being adapted to record the second converted audio signal included in said composite signal in said auxiliary signal recording parts of the video signal recording sectors in the tracks. More specifically, in that the conversion means comprise data compression means for data reducing the digital audio signal so as to obtain the second converted digital audio signal. This for the reason that the auxiliary signal recording part of the video signal recording sector may have an insufficient storage capacity to store the audio signal in uncompressed form. Data compression to be carried out can be done in various ways. One data compression technique that has proven to be of high quality is the data compression technique applied in the DCC digital compact cassette system. Reference is made in this respect to various publications in the literature and patent publications, such as European patent application no. 402,973 corresponding to U.S. Pat. No. 5,323,396, document (4) in the list of references, European patent application no. 457.390 corresponding to U.S. Pat. No. 5,367,608, document (5) in the list of references, and European patent application no. 457.391 corresponding to U.S. Pat. No. 5,365,553, document (6) in the list of references. Another example is the compression algorithm carried out in the 8 mm PCM audio recording system.

The recording arrangement may be further characterized in that the arrangement is adapted to generate an indicator signal indicating that the auxiliary signal recorded in the auxiliary signal recording parts of the video signal recording sectors in the tracks is an audio signal corresponding to the digital video signal recorded in the video signal recording sectors, signal combining means being present to combine the indicator signal into the composite signal for recording in the tracks. In this way, a reproducing arrangement for reproducing the information recorded on the longitudinal record carrier by means of the above described recording arrangement, is capable of retrieving the audio signal from the auxiliary signal recording part of the video signal recording sectors in the tracks.

It will be clear that the invention is of great importance in camcorders, as the loss of the original audio information of personally made recordings during editing is not wanted.

BRIEF DESCRIPTION OF THE DRAWINGS

These and other aspects of the invention will be apparent from and elucidated with reference to the embodiments described in the following figure description. In the drawings

DESCRIPTION OF THE PREFERRED EMBODIMENTS

Figure 1:
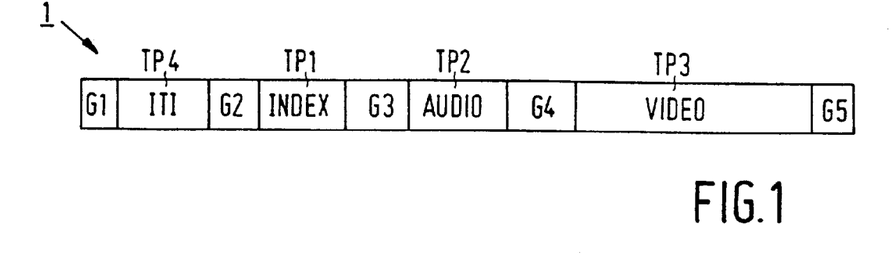
FIG. 1 shows, schematically, the format of the signals recorded in a track on the record carrier.

FIG. 1 shows the format of the signals as they are recorded in a track on a magnetic record carrier by means of a helical scan videorecorder. The left end of the track 1 in FIG. 1 is the start of the track and the right end of the track is the terminal part of the track. The track comprises a number of track parts. The track part denoted by G1 is the pre-amble track part. An example of the preamble track part G1 has been described extensively in reference (1).

The track part Gi is followed by tracking tone recording part TP4, which is denoted by ITI (insert timing information) track part and which contains a tracking tone, synchronisation information and identification (or timing) information. Further explanation of the contents of the m track can be found in reference (3).

The track part TP4 is followed by an edit gap G2. The edit gap G2 is followed by the track part TP1, which is denoted by INDEX and which comprises, among others, subcode information, such as absolute and/or relative time information and a table of contents (TOC). The edit gap G3 is followed by a track part TP2 which is the audio signal recording sector and comprises digital audio information. The edit gap G4 is followed by a track part TP3 which is the video signal recording sector and comprises digital video information. The track is terminated by the track part G5.

It can be said that the sequence order in which the parts TP1, TP2 and TP3 occur in the tracks may be different. That is: the index part TP1 may follow the video signal recording sector TP3, or the audio signal recording sector TP2 and the video signal recording sector TP3 may be exchanged.

Figure 2:
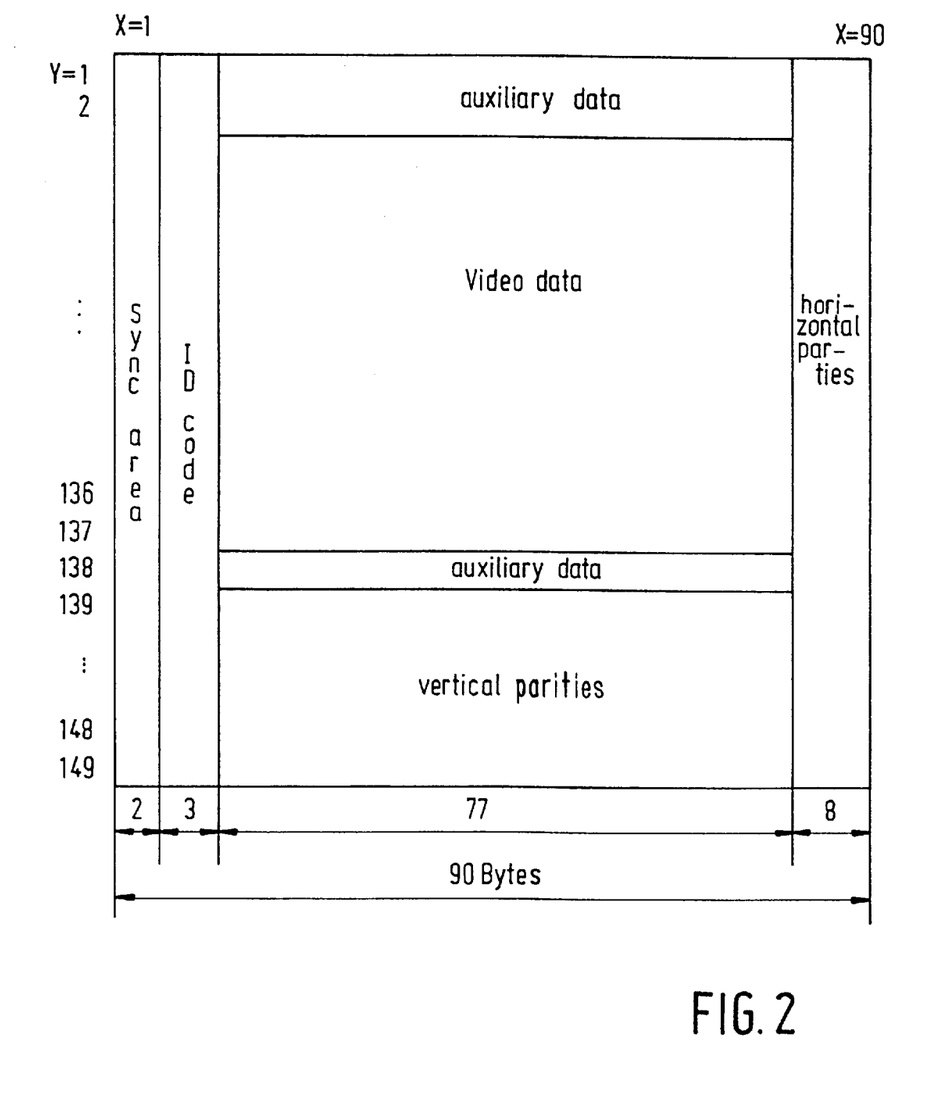
FIG. 2 shows, schematically, the contents of the video signal recording sector.

The contents of the video signal recording sector TP3 is given in FIG. 2. FIG. 2 in fact shows schematically the contents of a memory in which bytes of information are stored in storage locations in the memory denoted by an address (x,y), where x denotes the x-coordinate of the storage location and y denotes the y-coordinate of the storage location. The bytes are 8 bits each. The x-coordinate runs from 1 to 90 and the y-coordinate runs from 1 to 149, so that 90 bytes of information can be stored in each row, and 149 rows are present. The first two columns (x=1 and x=2) of the memory are filled with synchronization pattern of 2 bytes long in each row. The following three bytes in each row are filled with an ID code, comprising, among others, information which indicates the row number of the memory. The last eight columns comprise horizontal parity information, 8 bytes long in each row. Vertical parity information is stored in the storage locations x=6 to x=82 inclusive of the last 11 rows.

Bytes of video signal information are stored in the storage locations x=6 to x=82, inclusive, of the rows y=3 to y=137 inclusive. Bytes of auxiliary data are stored in the storage locations x=6 to x=82, inclusive, of the rows having the row numbers y=1, 2 and 138. The memory of FIG. 2 is read out linewise, starting with the information stored in line y=1, followed by the line y=2, and so on until the line y=149. The total information stored in the memory of FIG. 2 fits in the video signal recording sector TP3 of FIG. 1.

The auxiliary data for storage in the lines y=1, 2 and 138 can be teletext data or control data.

It should be noted here that it can be specified that the auxiliary data will be stored in a different location in the memory. Reference is made in this respect to document (1), FIG. 13, where the auxiliary data is stored in the memory part denoted by III.

Figure 3:
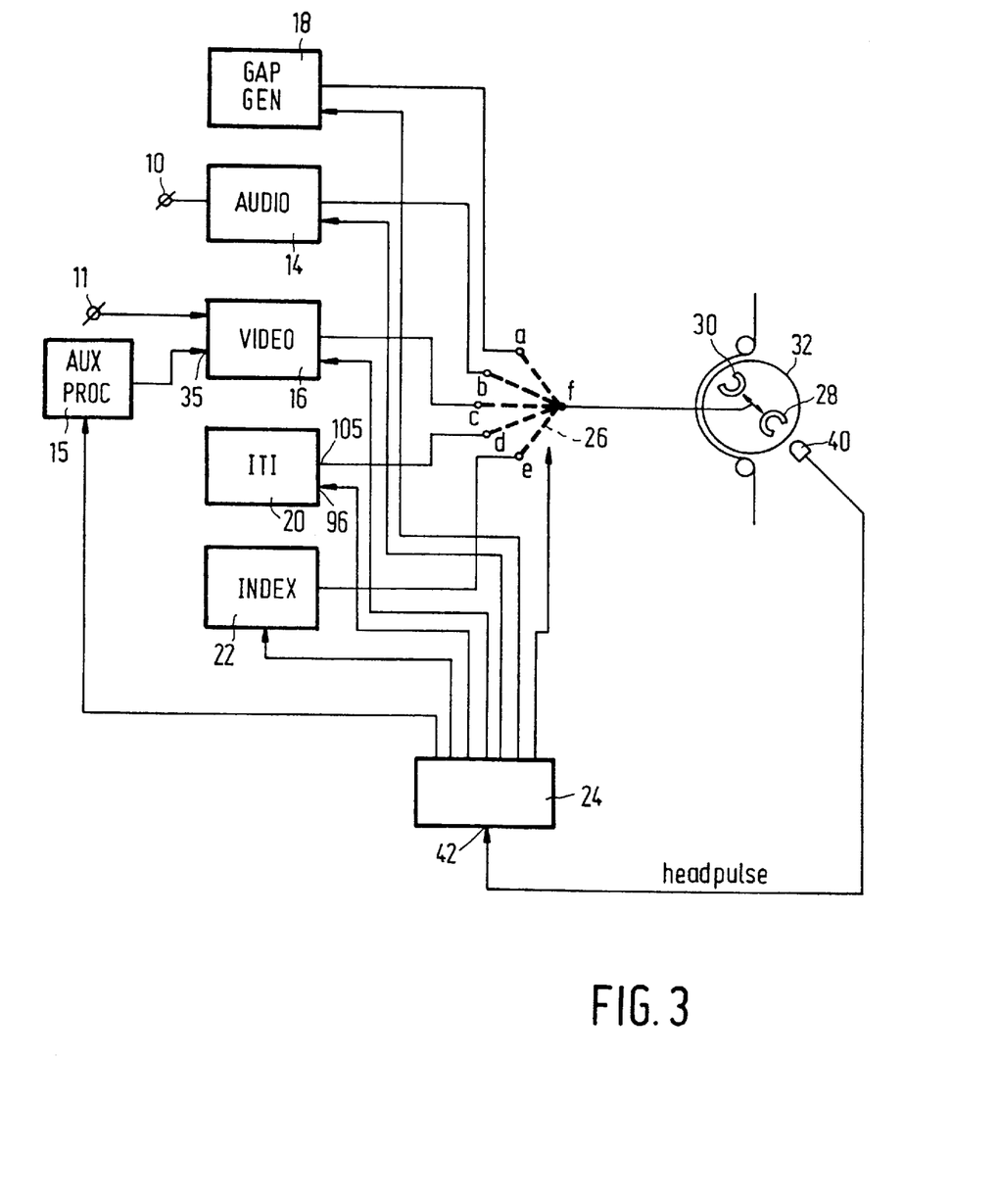
FIG. 3 shows a recording arrangement described in a previous patent application.

FIG. 3 schematically shows an embodiment of a recording arrangement as schematically described in reference (3). The arrangement comprises a first and a second input terminal 10 and 11, respectively, for receiving a digital audio signal and a digital video signal, respectively. The video signal can be generated by an optical picture pickup system of a camcorder and the corresponding audio signal can be generated by the microphone of the said camcorder. After digitization, both signals can be applied to the terminals 10 and 11. The digital audio signal can be converted in the conversion means 14 in a way as described in reference (1). The digital video signal can be converted in the conversion means 16 in a way as also described in reference (1). The order in which the blocks of audio- and video information are recorded in a track is however in the reverse order as described in the said patent application.

The arrangement comprises an edit-gap signal generator 18, a tracking tone signal (or ITI signal) generator 20, an index generator 22 and a central processing unit 24. Outputs of the generators 18, 20 and 22, and of the conversion means 14 and 16 are each coupled to a corresponding terminal of a multi-position switch 26, an output terminal (f) of which is coupled to write heads 28 and 30, preferably via a channel modulator (not shown), which heads are accommodated on a rotatable head drum 32. Further, an auxiliary signal generator 15 is present for supplying the auxiliary signal for storage in the video signal recording sector TP3. To that purpose, an output of the generator 15 is coupled to a second input 35 of the video signal conversion means 16.

The central processing unit 24 is adapted to control and activate the generators 15, 18, 20 and 22, the conversion means 14 and 16 and the switch 26. A control signal input 42 of the central processing unit 24 is coupled to an output of a detector 40, which is located at a stationary position near the circumference of the head drum 32, which detector 40 supplies pulses for each rotation of the head drum, the pulses being a measure for the time instants that the start point of a new track is written.

At the start of the recording of a new track, like the track in FIG. 1, the central processing unit 24 generates a control signal for the edit gap generator 18, in response to a pulse applied to its input 42. Further, the unit 24 generates a control signal to the switch 26. Under the influence of this control signal, the switch positions itself in a position in which the terminals a and f are interconnected. The generator 18 generates the pre-amble signal for recording in the GI track part of the track. Next the unit 24 generates a control signal to the generator 20 and a control signal to the switch 26, such that it interconnects its terminals d and f. The generator 20 generates the 11 information for recording in the track part TP4. An embodiment of the generator 20 has been described in reference (3).

Now the central processing unit 24 generates a control signal to the edit-gap generator 18, and a control signal to the switch 26, which is again positioned in the position a–f. The generator 18 generates the edit gap signal, for recording the edit gap G2. Subsequently the processing unit 24 generates a control signal to the INDEX generator 22, and a control signal to the switch, which is now positioned in the position e–f. The generator 22 generates the signal for recording in the track part TP1 of the track in FIG. 1.

Next, the processing unit 24 supplies a control signal to the edit-gap generator 18 and the switch 26, so that the switch is again positioned into the position a–f. The generator 18 generates the edit gap signal, for recording the edit gap G3. This is followed by the generation of a control signal which is supplied to the audio conversion means 14, and a control signal to the switch 26, which is controlled into the position b–f. The audio information can now be recorded so as to obtain the audio signal recording sector TP2 of the track.

Next, the processing unit 24 supplies a control signal to the edit-gap generator 18 and the switch 26, so that the switch is again positioned into the position a–f. The generator 18 generates the edit gap signal, for recording the edit gap G4. This is followed by the generation of a control signal which is supplied to the generator 15, the video conversion means 16, and a control signal to the switch 26, which is controlled into the position c–f. The generator 15 supplies the auxiliary information for storage in the three lines of the memory of FIG. 2, as described above. Next, the conversion means 16 generates an information stream as described with reference to FIG. 2, where the contents of the memory of FIG. 2 is read out linewise. The video information can now be recorded by one of the heads 28 or 30 so as to obtain the video signal recording sector TP3 of the track.

It should be noted here, that the memory of FIG. 2 is for explanatory purposes, for one reason, because of the fact that the sync information and the ID codewords need not be stored in the memory, but can be added to the serial datastream when retrieving the video data and the auxiliary data from the memory. The storage capacity of the memory is then smaller and comprises only 85 columns of storage locations.

Finally, the processing unit 24 supplies a control signal to the edit-gap generator 18 and the switch 26, so that the switch is again positioned into the position a–f. The generator 18 generates the edit gap signal for recording as the post-amble track part G5.

This recording process is repeated when recording subsequent tracks.

Editing the audio signal recorded in the audio signal recording sector TP2 means that another audio signal is applied to the input 10 and that this audio signal is converted in the converter 14 and subsequently recorded in the sector TP2 of the previously recorded track by overwriting the originally recorded audio information recorded in said sector TP2. The information recorded in the other track parts of the said track remains unchanged. In this way, a new audio signal can be recorded for a later reproduction together with the original video signal. The consequence of this editing function is however, that the original audio signal has been lost.

Figure 4:
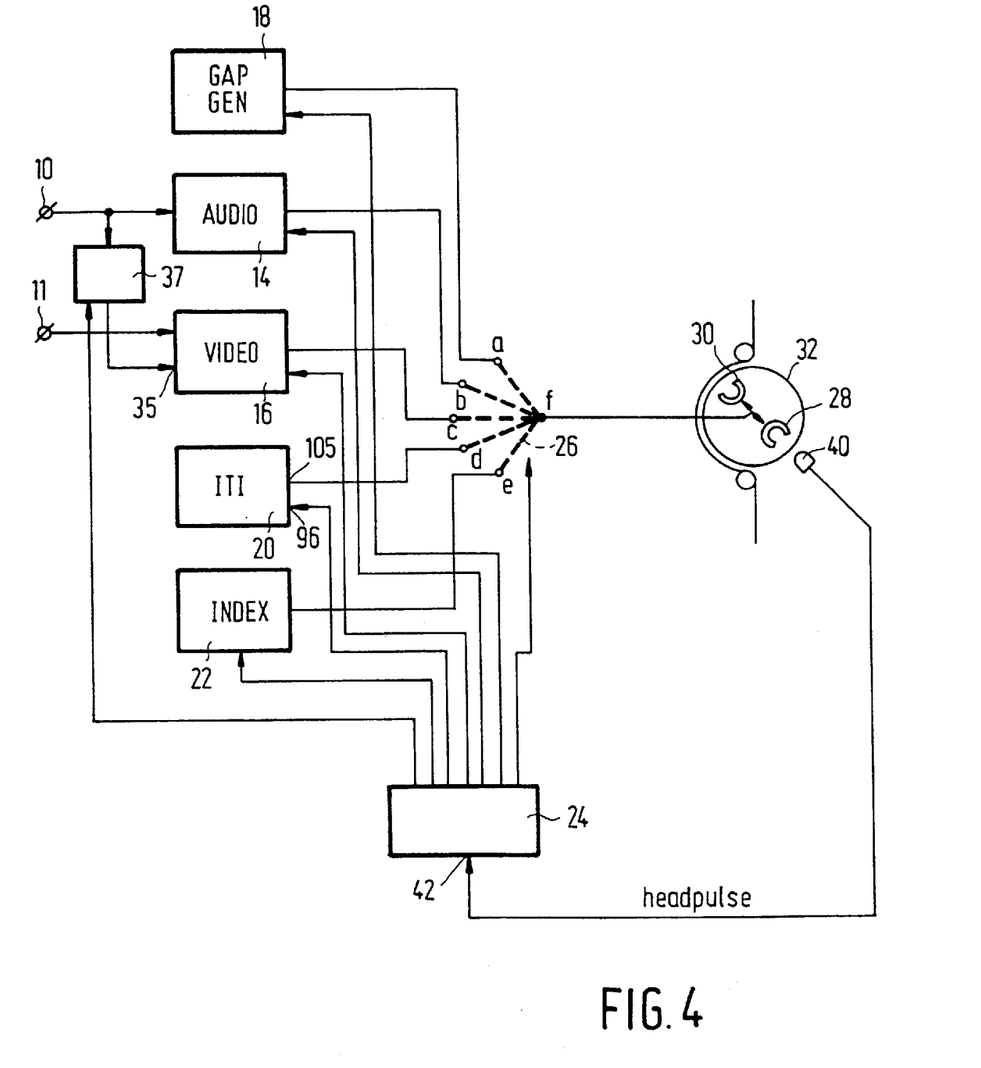
FIG. 4 shows a first embodiment of the subject invention.

FIG. 4 shows an embodiment of the recording arrangement of the present invention that overcomes this problem. The embodiment shows large resemblances with the embodiment of FIG. 3. In accordance with the invention, the input terminal 10, which receives the audio signal, is further coupled to a converter 37, which has its output coupled to the second input 35 of the converter 16. The converter 37 converts, under the influence of a control signal from the processing unit 24, the audio signal into such a form that it can be stored as auxiliary signal in the memory locations in the lines y=1, 2 and 138, so that it can be stored in the video signal recording sector TP3 as if it was the auxiliary signal described above.

If the memory space available is insufficient for the processing of a wideband digital audio signal, data compression on the audio signal is required, and can be carried out in the converter 37.

An example: suppose that one picture, that is one videoframe of video information, is stored in 12 tracks, and the frame rate is 25 frames/s, this means that the bit rate of the auxiliary signal to be stored in the three lines can have a bit rate at the maximum of 554,4 kb/s (=12×25×3×77×8). This bitrate is sufficiently large for transmitting a data compressed audio signal that is compressed in accordance with the DCC (digital compact cassette) compression algorithm, which results in a bit rate of 384 kb/s for a compressed digital stereo audio signal.

Figure 5:
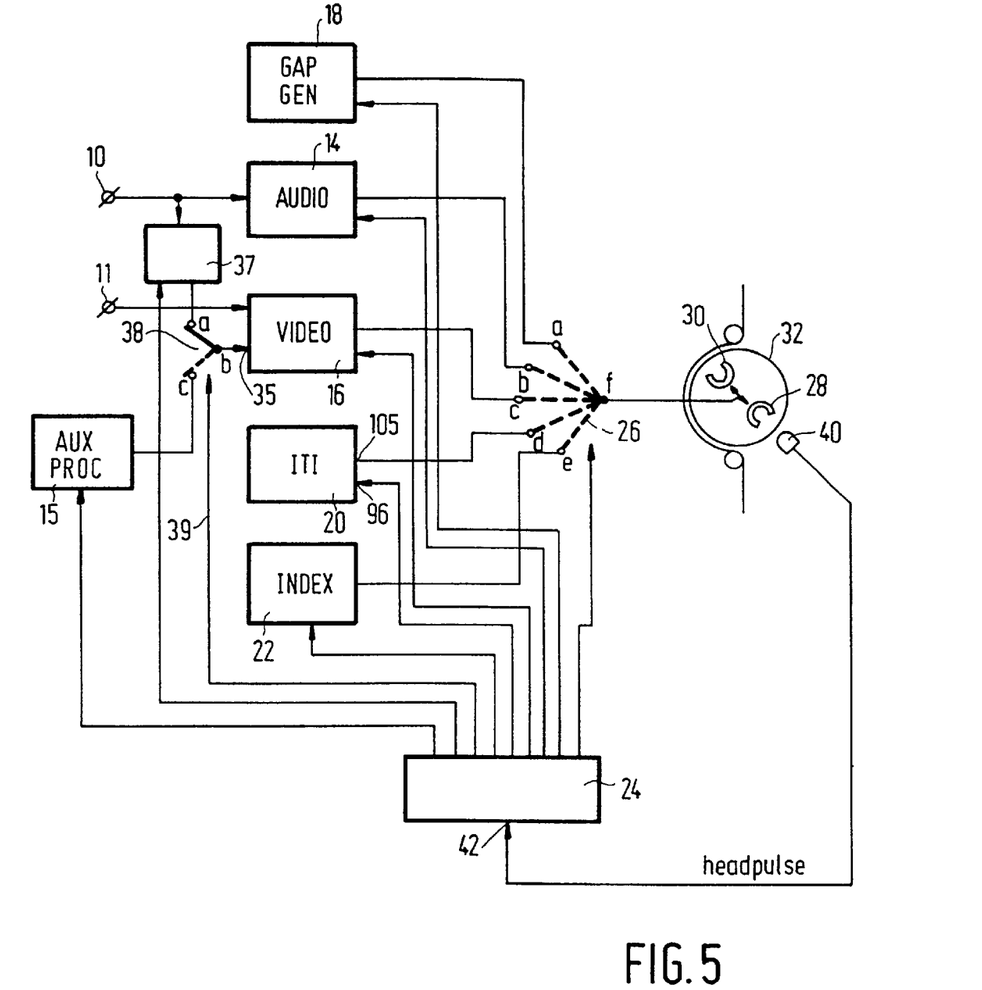
FIG. 5 shows, a second embodiment of the recording arrangement in accordance with the invention.

In the embodiment of FIG. 4, the generator 15 of FIG. 3 has been left out. FIG. 5 shows an embodiment of the invention, where the generator 15 has been introduced again. Outputs of the generator 1 and the converter 37 are coupled to terminals c and a, respectively, of a switch 38, which has a fixed terminal b coupled to the second input 3 of the converter 16. The user of the arrangement can decide whether an auxiliary signal or an audio signal will be stored in the auxiliary signal recording parts of the video signal recording sector TP3. Upon actuation of a button (not shown) by the user, the processor 24 generates a control signal via the line 39 so that the switch is positioned in either the position shown in FIG. 5, or the other position of the switch, shown by the broken line. In order to identify the nature of the signal recorded as auxiliary signal, the converter 37 can generate an indicator signal, identifying the auxiliary signal as an audio signal. This indicator signal can, e.g., be stored in the ITI sector TP4 or in the auxiliary signal itself. The auxiliary signal can be transmitted in packets of five bytes each. The first byte in the packet can be used to include the said indicator signal. Also the generator 15 can generate a corresponding indicator signal identifying the auxiliary signal as a certain auxiliary signal.

Figure 6:
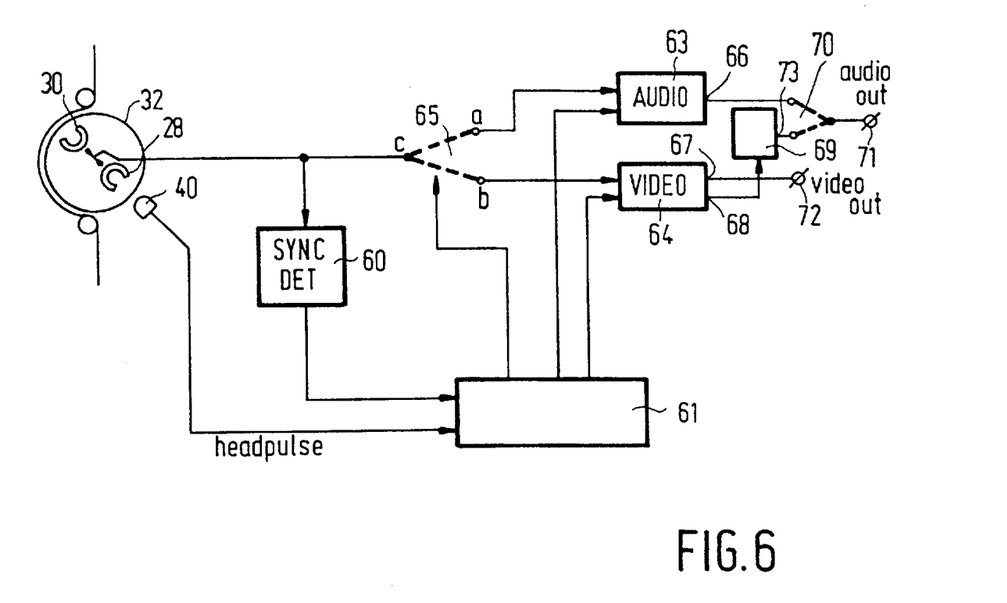
FIG. 6 shows a first embodiment of a reproducing arrangement.

FIG. 6 shows schematically only the most relevant parts of a reproducing arrangement in accordance with the invention. The information recorded in the tracks is read out by means of the heads 28 and 30 and supplied to a sync detector 60 for detecting the synchronization information as included in the sync area, see FIG. 2. In response to the detection of the synchronization information, as well as the head pulses supplied by the head 40, the processor unit 61 generates control signals to reconverter units 63 and 64 and to a switch 65. When the gap G3, see FIG. 1, is detected (by means not shown), the switch 6 is positioned in the position a–c, so that the information included in the audio signal recording sector TP2 is fed to the reconversion unit 63. The reconversion unit 63 carries out a signal processing on the signal received in an inverse manner as the converter unit 14 of FIG. 4, so that a replica of the original audio signal is supplied to its output 66. When the gap G4, see FIG. 1, is detected (by means not shown), the switch 6 is positioned in the position b–c, so that the information included in the video signal recording sector TP3 is fed to the reconversion unit 64. The information is stored in said reconversion unit 64, e.g., in the way as shown in FIG. 2. The reconversion unit 64 retrieves the video information from the information stored in the memory and carries out a signal processing on the signal retrieved in an inverse manner as the converter unit 16 of FIG. 4, so that a replica of the original video signal is supplied to its output 67, and via this output 67 to the video signal output terminal 72.

The reconversion unit 64 also retrieves the auxiliary signal from the lines y=1, 2 and 138 and supplies the signal to the output 68. This output is coupled to an input of a reconversion unit 69, in which a signal processing inverse to the signal processing carried out in the converter 37 of FIG. 3 is carried out. As a result, a replica of the original audio signal is also available at the output 73 of the reconversion unit 69.

Output means for outputting either one of the two audio signals are present in the form of a switch 70. With the switch 70 in the upper position, the audio signal regenerated by the reconversion unit 63 is supplied to the output terminal 71. With the switch 70 in the lower position, the audio signal regenerated by the reconversion unit 69 is supplied to the output terminal 71.

The switch can be actuated by hand.

Figure 7:
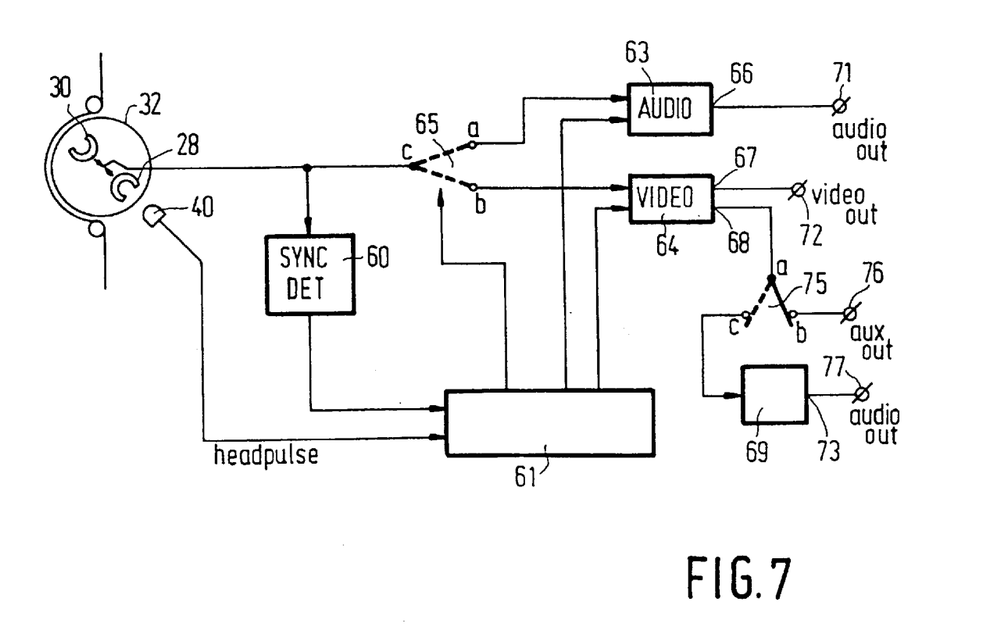
FIG. 7 a second embodiment of a reproducing arrangement.

In another embodiment, shown in FIG. 7, the reproducing arrangement comprises an indicator signal detector (not shown), for detecting the indicator signal indicating the type of signal transmitted as the auxiliary signal in the video signal recording sectors TP3. The second output 68 of the reconversion unit 64 is now coupled to the fixed terminal a of a switch 75. A terminal b of the switch 75 is coupled to an auxiliary output terminal 76, and a terminal c of the switch 75 is coupled to a second audio output terminal 77 via the reconversion unit 69.

Upon detecting an indicator signal, indicating that an audio signal is included in the auxiliary signal recording parts of the video signal recording sectors in the tracks, a control signal is generated and applied to a control signal input (not shown) of the switch 75, which positions the switch in the position a–c. If the auxiliary signal recording parts of the video signal recording sectors include an auxiliary signal, not being an audio signal, another control signal is generated, under the influence of which the switch is positioned in the a–b position, so that the auxiliary signal can be outputted at the terminal 76.

The invention is thus based on the storage of the audio signal corresponding to a video signal in the auxiliary signal recording parts of the video signal recording sectors in the tracks, so as to enable editing on the audio signal in the audio signal recording sectors without losing the original audio information.

REFERENCES (1) European patent application no. 492,704, corresponding to U.S. Pat. No. 5,245,483 (PHN 13.546)
(2) European patent application no. 93.202.950, corresponding to U.S. patent application Ser. No. 08/127,223, filed Sep. 27,1993, now U.S. Pat. No. 5,424,878 (PHN 14.241)
(3) European patent application no. 93,201,263, corresponding to U.S. patent application Ser. No. 08/185,638, filed Jan. 24, 1994, now U.S. Pat. No. 5,400,187 (PHN 14.449)
(4) European patent application no. 402,973, corresponding to U.S. Pat. No. 5,323,396 (PHN 13.241)
(5) European patent application no. 457.390, corresponding to U.S. Pat. No. 5,367,608 (PHN 13.328)
(6) European patent application no. 457.391, corresponding to U.S. Pat. No. 5,365,553 (PHN 13.329)

What is claimed is:

1. Arrangement for recording a digital video signal and a corresponding digital audio signal in slant tracks on a longitudinal magnetic record carrier, said tracks comprising an audio signal recording sector and a video signal recording sector for storing the digital audio signal and the digital video signal, respectively, the arrangement comprising:

first and second input terminals for receiving the digital audio signal and the digital video signal, respectively;

conversion means for converting the digital audio signal and the digital video signal to form a composite signal for recording on the record carrier;

recording means for recording the converted digital audio signal and digital video signal in said composite signal in the audio signal recording sector and the video signal recording sector, respectively, of a track, the video signal recording sector in a track further comprising an auxiliary signal recording part for storing an auxiliary signal;

means for additionally storing the digital audio signal in the auxiliary signal recording parts of the video signal recording sectors in the tracks;

means for generating an indicator signal indicating that the auxiliary signal recorded in the auxiliary signal recording parts of the video signal recording sectors in the tracks is an audio signal corresponding to the digital video signal recorded in the video signal recording sectors; and signal combining means for combining the indicator signal into the composite signal for recording in the tracks.

2. Arrangement as claimed in claim 1, characterized in that the conversion means further comprises means for converting the digital audio signal into a second converted digital audio signal to form the composite signal and the recording means further recording the second converted audio signal included in said composite signal in said auxiliary signal recording parts of the video signal recording sectors in the tracks.

3. Arrangement as claimed in claim 2, characterized in that the conversion means comprise data compression means for data reducing the digital audio signal to form the second converted digital audio signal.

4. Arrangement as claimed in claim 1, characterized in that, the arrangement is in the form of a camcorder.

5. Arrangement for reproducing a digital video signal and a corresponding digital audio signal from a longitudinal magnetic record carrier, said digital video signal and said digital audio signal being recorded in slant tracks on a longitudinal magnetic record carrier, said tracks comprising an audio signal recording sector and a video signal recording sector in which a first information signal relating to the digital audio signal and a second information signal relating to the digital video signals respectively, are stored, the video signal recording sector in a track further comprising an auxiliary signal recording part for storing a third information signal representing an auxiliary signal, the arrangement comprising:

reading means for reading the signals recorded in the tracks;

reconversion means for reconverting the first information signal and the second information signal into a reproduced digital audio signal and a reproduced digital video signal, respectively; and first and second output terminals for supplying the reproduced digital audio signal and the reproduced digital video signal, respectively, characterized in that a third information signal which relates to the digital audio signal is stored in the auxiliary signal recording part of the video signal recording sector in a track, and the reconversion means comprises means for reconverting the third information signal into the reproduced digital audio signal, the arrangement further comprising output means for outputting the reproduced digital audio signal obtained from the reconversion of the third information signal.

6. Arrangement as claimed in claim 5, characterized in that the reconversion means comprises data expansion means for carrying out data expansion on the third information signal to form the reproduced digital audio signal from said third information signal.

7. Arrangement as claimed in claim 6, characterized in that an indicator signal. indicating that the third information signal recorded in the auxiliary signal recording parts of the video signal recording sectors in the tracks is an audio signal corresponding to the digital video signal recorded in the video signal recording sectors, is included in the information recorded in said tracks, and said arrangement further comprises retrieving means for retrieving the indicator signal from the information read from the tracks.

8. Arrangement as claimed in claim 5, characterized in that an indicator signal, indicating that the third information signal recorded in the auxiliary signal recording parts of the video signal recording sectors in the tracks is an audio signal corresponding to the digital video signal recorded in the video signal recording sectors, is included in the information recorded in said tracks, and said arrangement further comprises retrieving means for retrieving the indicator signal from the information read from the tracks.

9. Arrangement as claimed in claim 8, characterized in that the output means outputs the reproduced digital audio signal to an audio output terminal in response to the occurrence of said indicator signal.

10. Longitudinal magnetic record carrier having slant tracks each comprising an audio signal recording sector and a video signal recording sector, each of said audio signal recording sectors having a digital audio signal stored therein and each of said video signal recording sectors having a digital signal stored therein, each of said video signal recording sectors further having an auxiliary signal recording part for storing an auxiliary signal, characterized in that said digital audio signal is additionally stored in said auxiliary signal recording parts.

11. A longitudinal magnetic record carrier as claimed in claim 10, characterized in that an indicator signal, indicating that the digital audio signal corresponding to the digital video signal recorded in the video signal recording sectors is additionally recorded in the auxiliary signal recording part, is recorded in said tracks.

* * * * *